United States Patent [19]

Maekawa et al.

[11] Patent Number: 5,081,628
[45] Date of Patent: Jan. 14, 1992

[54] CORDLESS KEYBOARD

[75] Inventors: Hitoshi Maekawa; Yuji Hirano, both of Owariasahi, Japan

[73] Assignee: Hitachi, Ltd., Tokyo, Japan

[21] Appl. No.: 401,802

[22] Filed: Sep. 1, 1989

[30] Foreign Application Priority Data

Sep. 17, 1988 [JP] Japan .................. 63-233267

[51] Int. Cl.$^5$ .................. G06F 11/00; H04L 1/14
[52] U.S. Cl. ...................... 371/34; 455/69; 359/142
[58] Field of Search .............. 371/34; 455/69, 603

[56] References Cited

U.S. PATENT DOCUMENTS

| | | | |
|---|---|---|---|
| 3,680,045 | 7/1972 | Meidan | 371/34 |
| 3,934,224 | 1/1976 | Dulaney et al. | 371/34 |
| 4,254,499 | 3/1981 | Yoshikane | 371/34 |
| 4,313,227 | 1/1982 | Eder | 455/617 |
| 4,471,440 | 9/1984 | Check, Jr. | 364/464.02 |
| 4,628,537 | 12/1986 | Shimakata et al. | 455/34 |
| 4,631,601 | 12/1986 | Brugliera et al. | 455/603 |
| 4,672,154 | 6/1987 | Rodgers et al. | 178/19 |
| 4,673,976 | 6/1987 | Wreford-Howard | 371/34 |
| 4,763,291 | 8/1988 | Schwaber | 364/709.1 |
| 4,764,981 | 8/1988 | Miyahara et al. | 455/603 |
| 4,792,996 | 12/1988 | Oyama | 455/603 |

OTHER PUBLICATIONS

Remote Key Input to Personal Computer, IBM Technical Disclosure Bulletin, vol. 29, No. 9, Feb. 1987, pp. 4201-4202.

Primary Examiner—Charles E. Atkinson
Attorney, Agent, or Firm—Fay, Sharpe, Beall, Fagan, Minnich & McKee

[57] ABSTRACT

Signals are transmitted using light or the like in a cordless manner between a keyboard and a controller related thereto. The keyboard transmits a signal that indicates a keycode corresponding to a key to the controller in a cordless manner, and the controller sends the keycode signal back to the keyboard. The keyboard compares the transmitted keycode with the received keycode to check whether the keycode signal is correctly transmitted to the controller. When the communication is to be carried out between a plurality of keyboards and the related controllers, a device code specific to the keyboard is attached to the keycode such that the individual keyboards can be identified.

16 Claims, 4 Drawing Sheets

|  | (4)<br>$V_{H1}$ | (4.5)<br>$V_{H2}$ | (5)<br>$V_{H3}$ |
|---|---|---|---|
| $V_{L1}$<br>(2) | $C_1$ | $C_2$ | $C_3$ |
| $V_{L2}$<br>(2.5) | $C_4$ | $C_5$ | $C_6$ |
| $V_{L3}$<br>(3) | $C_7$ | $C_8$ | $C_9$ |

CORDLESS KEYBOARD

BACKGROUND OF THE INVENTION

The present invention relates to data processing apparatus including a cordless keyboard used for office computers, personal computers and terminal equipment in banks.

In the office computers, personal computers and terminal equipment in banks, the devices are grouped depending upon their functions into keyboards for operation, CRT displays for monitoring, and control units for effecting electronic processing from the standpoint of improving operability and effectively utilizing the desk. On the desk are arranged the keyboard with which the operation can be carried out at all times and the CRT display, and the control unit that requires no operation is installed under or by the desk. Cables run among them hindering the operation, occupying space and impairing the appearance. Therefore, attempts have been made to eliminate the wires by using optical signals instead of using cables as disclosed in, for example, U.S. Pat. No. 4,313,227.

According to the conventional apparatus, however, reliability is not necessarily maintained sufficiently in transmitting the signals between the keyboard and the control unit without using cord. Furthermore, under the environment in which the office computers or terminal equipment in a bank are operated simultaneously such as in an office or at the windows of the bank, light affects one another among the apparatuses from which erroneous operation may result.

With the keyboard having no wire, furthermore, the circuitry in the keyboard must be operated by a power source such as cells. When used for business in offices and in banks, the keyboard must be operated for about eight hours a day, and the cells must be renewed or must be recharged almost everyday.

SUMMARY OF THE INVENTION

The object of the present invention is to solve such assignments inherent in the prior art and to provide a cordless keyboard which does not erroneously operate and which maintains high reliability in transmitting signals even when a plurality of apparatuses are simultaneously operated.

Another object of the present invention is to provide a cordless keyboard which does not require the cells to be renewed or electrically recharged, and which features improved operability.

The present invention is concerned with a cordless keyboard comprising means through which a keyboard transmits keycodes to a corresponding controller, means which receives keycodes that are sent back from the controller, and means which compares the transmitted keycodes with the received keycodes.

The present invention is further concerned with a cordless keyboard which is served with electric power via a high-frequency coil embedded in a desk on which the keyboard is placed and via a receiving coil in the keyboard.

DESCRIPTION OF THE PREFERRED EMBODIMENTS

Embodiments of the invention will now be described in detail in conjunction with the drawings.

Figure 1:
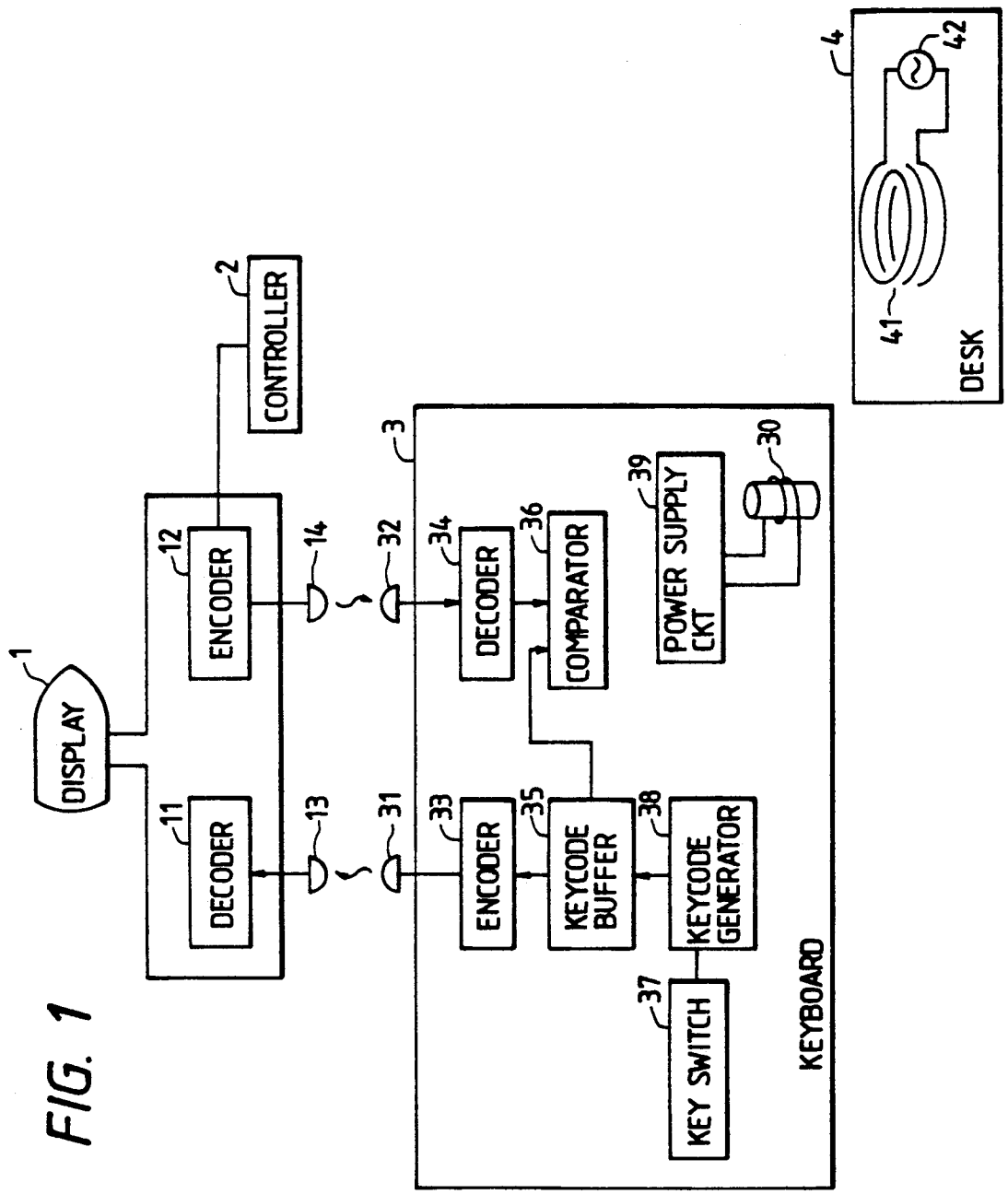
FIG. 1 is a diagram illustrating the constitution of a terminal controller in a bank using a cordless keyboard of the present invention.

FIG. 1 is a diagram illustrating the constitution of a terminal controller in a bank using a wireless keyboard according to an embodiment of the present invention.

In FIG. 1, reference numeral 1 denotes a display, 2 denotes a controller, 3 denotes a keyboard module, and 4 denotes a desk on which the keyboard 3 is placed. The display 1 and the controller 2 are connected together as one module through an interface cable. Data are exchanged between the keyboard 3 and the display 1 in the form of light signals using light-emitting elements 14, 31 and light-receiving elements 13, 32. When a given key is depressed in a key switch 37, a keycode corresponding to the key is formed by a keycode generator 38. The keycode is stored in a keycode buffer 35 and to which is attached a uniquely specific device code of the keyboard by an encoder 33. After being modulated with a frequency specific to the keyboard, the encoded keycode is converted into radiation, such as a light signal through an electro-photo converter 31. The light signal is converted from received radiation into an electric signal through a photo-electric converter 13. The device code of the keyboard 3 is picked up by the decoder 11 and is sent to the controller 2 via a cable. The controller 2 determines whether a parent-child relationship is established or not relative to the controller 2. The device code that has the parent-child relationship is the one by which the device that has received the signal can be recognized.

When the keyboard has the parent-child relationship as determined by the controller, the keycode is received by the controller 2, a uniquely specific device code is attached thereto by an encoder 12 that is similar to the encoder 33, and the keycode is modulated with a frequency specific to the controller 2 and is returned as an encoded keycode back to the keyboard 3 via an electro-photo converter 14 and a photo-electric converter 32. As for the encoded keycode that is returned back, the controller device code sent from the controller 2 is picked up by the decoder 34 that is similar to the decoder 11 for the keyboard to determine whether they establish a parent-child relationship or not. When the parent-child relationship is established by the keyboard, a comparator 36 compares the keycode that is returned back with the keycode stored in the keycode buffer 35. When the output of the comparator 36 indicates the coincidence, the input of the key depressed in the next time is processed. The key input of the next time is transmitted after a predetermined period of time $T_1$ has passed. When the output of the comparator 36 indicates the noncoincidence, the keycode stored in the key buffer 35 is transmitted to the controller 2 according to the algorithm that is the same as the one mentioned above within the predetermined period of time $T_1$ The controller 2 sends back again the keycode that is returned back, and monitors the signal from the keyboard 3 for the predetermined period of time $T_1$ When there is no signal from the keyboard for the period of time $T_1$ after the returned keycode had been sent, the keycode received at first is treated as true data. Further, when the controller 2 has received the keycode from the keyboard 3 that has the parent-child relationship within the period of time $T_1$, the keycode that was received previously is determined to be an incorrect keycode. The keycode received within the time $T_1$ is regarded to be the one that is received first, and the above-mentioned keycode is returned back to the keyboard 3. The above-mentioned operation is carried out repetitively.

The controller 2 may return back its specific device code received from the keyboard 3. Alternatively a different specific device code may be returned back. In the latter case, erroneous operation is prevented from taking place that may be caused upon receipt of a reflected wave signal of the signal sent from the keyboard 3.

Within the time $T_1$, the controller 2 recognizes only those series of signals having the same device code as the device code attached to the keycode received previously, as the keyboard 3 having a parent-child relationship.

Figure 5:
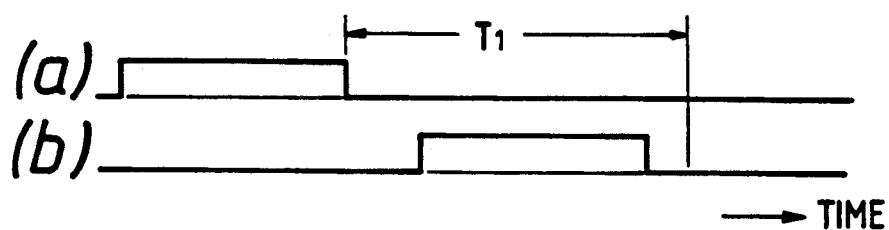
FIG. 5 is a time chart for determining whether the data is correct or incorrect.

FIG. 5 is a time chart illustrating the operation for comparing the keyboard data.

FIG. 5(a) shows a signal with which the controller 2 sends the keycode for confirmation back to the keyboard 3, and FIG.5(b) shows a signal sent again by the keyboard 3 or noise. In the foregoing description, when the device codes picked up from the data received by the controller 2 or the keyboard 3 are determined to establish no parent-child relationship, the signals that are received are all invalidated.

Figure 3:
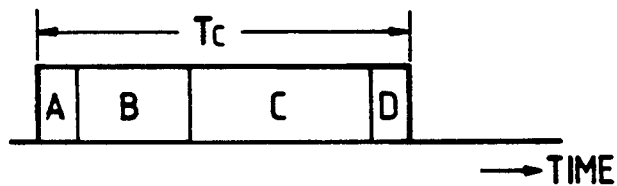
FIG. 3, is a diagram showing signal blocks for the keycodes.

FIG. 3 is a diagram showing a signal formed by the encoder. Namely, FIG. 3 shows a signal block for sending a keycode, wherein a portion A denotes a start bit, a portion B denotes a device code, a portion C denotes a keycode, and a portion D denotes a stop bit. The portions A and D maintain a start-stop synchronism of serial transfer. A parity bit may be provided between the portions C and D. Each block has a period Tc.

Figure 2:
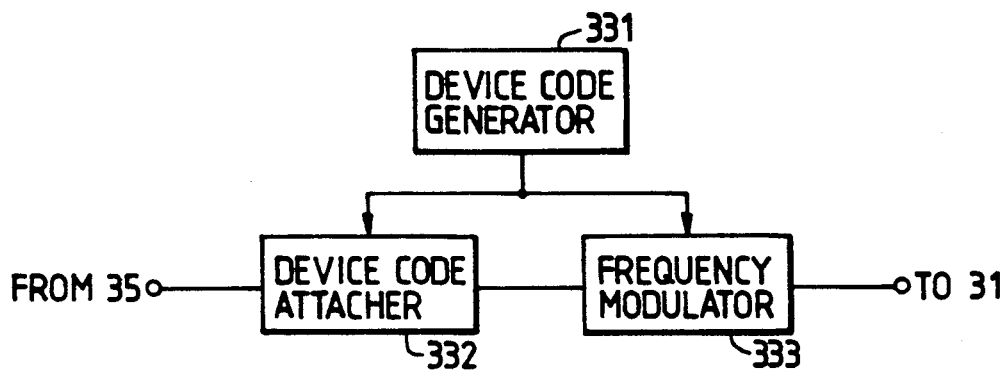
FIG. 2 is a diagram which concretely illustrates the constitution of an encoder of FIG. 1.

FIG. 2 is a block diagram illustrating a concrete example of encoder of FIG. 1.

In FIG. 2, reference numeral 331 denotes a device code generator, 332 denotes a device code attacher, and 333 denotes a frequency modulator. Concretely speaking, the device code generator 331 consists of a dip switch or a ROM (read-only memory) which generates a code specific to the device. The device code attacher 332 attaches the device code, start bit and stop bit to the signal from the keycode buffer 35 to form a serial signal that is shown in FIG. 3. The serial signal is input to the frequency modulator 333 which produces frequencies $f_H$ and $f_L$ to "1" (logic 1) and "0" (logic 0) of the input signals. Here, any frequencies are assigned to $f_H$ and $f_L$. For example, when three kinds of frequencies are assigned to $f_H$ and $f_L$, respectively, the higher frequencies for "1" are $f_{H1}$, $f_{H2}$ and $f_{H3}$, and the lower frequencies for "0" are $f_{H1}$, $f_{H2}$ and $f_{L3}$. The frequencies $f_H$, $f_L$ are selected depending upon the output of the device code generator 331.

Figure 4:
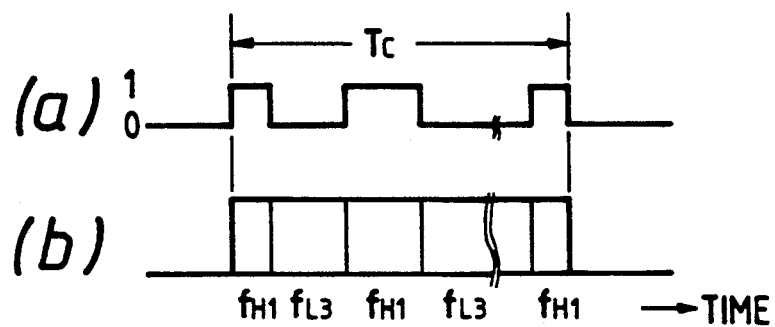
FIG. 4 is a time chart of signal waveforms of the encoder of FIG. 1.

FIG. 4 denotes a frequency modulator of the case when $f_H$ corresponding to "1" is $f_{H1}$ and $f_L$ corresponding to "0" is $f_{L3}$. FIG. 4(a) shows signals "1" and "0", and FIG. 4(b) shows modulated signals of the corresponding frequencies $f_{H1}$ and $f_{L3}$.

In the foregoing description, though three frequencies were assigned to $f_H$ and $f_L$, any number of frequencies may be set arbitrarily depending upon the required number of device codes.

Figure 6:
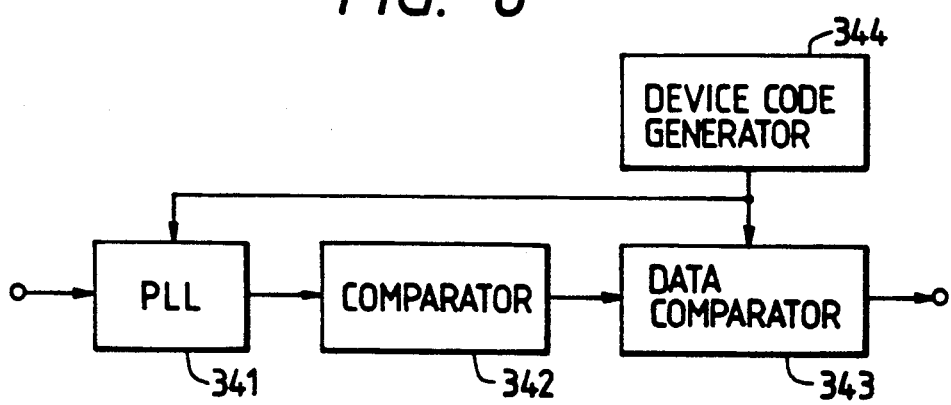
FIG. 6 is a diagram which concretely illustrates the constitution of a decoder of FIG. 1.

FIG. 6 is a diagram which concretely illustrates the constitution of the decoder of FIG. 1.

In FIG. 6, reference numeral 341 denotes a PLL (phase locked loop), 342 denotes a comparator, 343 denotes a data comparator, and 344 denotes a device code generator. Described below is the demodulation operation of the decoder in the cases of the modulation frequencies $f_{H1}$ and $f_{L3}$.

The frequency-dividing ratio of the PLL 341 is set by the output of the device code generator 344. The PLL 341 produces an output $E_H$ when the frequency is $f_{H1}$ for the input waveform of FIG.4(b) and produces an output EL when the frequency is $f_{L3}$. Here, the frequency-dividing ratio of the PLL 341 and the threshold values $f_H$, $f_L$ of the comparator 342 are so determined that the outputs $E_H$, $E_L$ of the PLL 341 will lie within voltage-comparing ranges ($V_{HL}$ to $V_{HH}$ and $V_{LL}$ to $V_{LH}$) of the comparator 342. Thus, the PLL 341 produces the voltage $E_H$ for $f_{H1}$ to meet the range $V_{HL}$ to $V_{HH}$ and produces the voltage $E_L$ for $f_{L3}$ to meet the range $V_{LL}$ to $V_{LH}$. For other frequencies, either one of $E_H$ or $E_L$ or both of them fall outside the ranges $V_{HL}$ to $V_{HH}$ and $V_{LL}$ to $V_{LH}$. The comparator 342 compares voltages of outputs of PLL 341 to obtain a waveform FIG. 4(a) from the waveform of FIG. 4(b). The data comparator 343 picks up the device code B (refer to B of FIG. 3) from the above decoded signal block and compares it with the output of the device code generator 344. When they are in agreement, the data comparator 343 produces a coincidence signal.

Figures 7, 8:
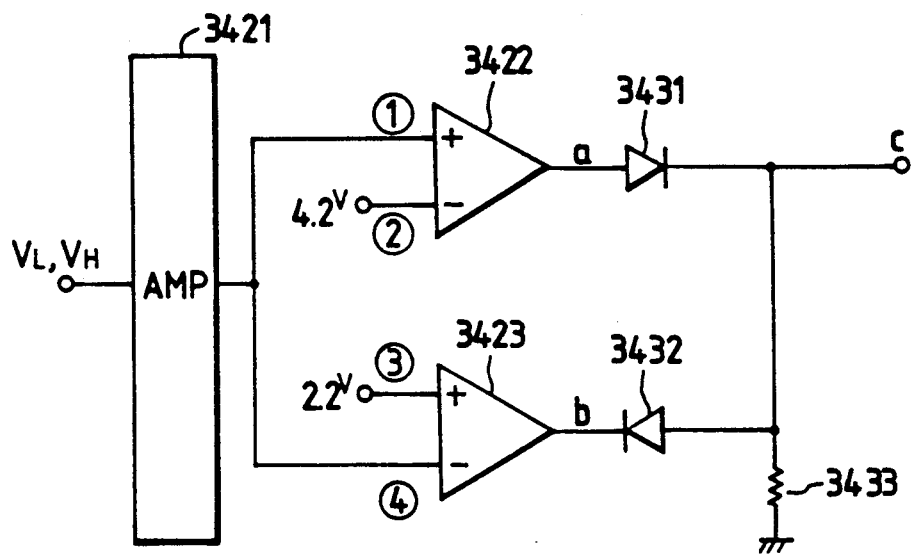
FIG. 7 is a diagram which illustrates in detail the constitution of a comparator and a data comparator of FIG. 6.
FIG. 8 is a diagram illustrating voltages input to the comparator of FIG. 7.

FIG. 7 is a diagram which concretely illustrates the constitution of the comparator and the data comparator of FIG. 6, and FIG. 8 is a diagram illustrating the operation of FIG. 7.

In FIG. 7, reference numeral 3421 denotes an amplifier which shifts the voltages $V_H$, $V_L$ and amplifies the voltages $V_H$, $V_L$, reference numerals 3422 and 3423 denote comparators, 3431 and 3432 denote diodes for preventing the counterflow, and 3433 denotes a resistor.

As an example, voltages $V_H$ and $V_L$ are divided into three, respectively, to have voltages as indicated in parentheses in FIG. 8. First, considered below is the case of a combination $C_1$ of $V_H$ and $V_L$. When the amplifier 3421 has a zero shift quantity and an amplification factor of 1, the input $V_H$(4.0 V) causes the comparator 3422 to produce an output a which is $-V_{cc}$. That is, since the comparator has the input ① which is 4V and has the input ② which is 4.2V, the output becomes of a negative sign. When the (+) input is greater than the (−) input, the comparators 3422 and 3423 produce outputs Vcc. Conversely, when the (+) input is smaller than the (−) input, the comparators 3422 and 3423 produce outputs −Vcc. The output b of the comparator 3423 becomes +Vcc. Since the output a is −Vcc and the output b is +Vcc, no current flows through the resistor 3433, and the output c becomes equal to ground potential (GND).

Next, when the input is $V_{Ll}$ (2.0V), the comparator 3422 produces the output a which is $-V_{cc}$ and the comparator 3423 produces the output b which is $-V_{cc}$. Therefore, the output c becomes $-V_{cc}$ since a current flows through the diode 3432 and the resistor 3433. Here, the output c represents logic "1" when it is $+V_{cc}$, represents logic "C" when it is $-V_{cc}$, and represents indeterminate when it is GND. In the abovementioned case $C_1$, therefore, the output becomes indeterminate when the input is $V_H$.

Considered below is the case where the amplifier 3421 has an amplification factor n of 1.2 times ($n \geq 2.4/(V_H-V_L)$) and has a shift value Vs of $-0.4$ ($Vs=2.0-nV_L$). When $V_{H1}$ is input, the comparator 3422 has the input ① of 4.4V and the output a of $+V_{cc}$. Likewise, the comparator 3423 has the input ④ of 4.4V and the output b of $V_{cc}$. Therefore, the output c becomes $+V_{cc}$ (logic "1") Further, when $V_L$ is input, the comparator 3422 has the input ① and the comparator 3423 has the input ④ which are both 2.0V. Through the same processing as above, therefore, the comparators produce outputs a and b which are both $-V_{cc}$, and the output c becomes $-V_{cc}$ (logic "0"). Even in the cases of other combinations ($C_2$ to $C_9$), the amplification factor and the shift value of the amplifier 3421 should be set in the same manner so that the output c represents logics "1" and "0" for $V_H$ and $V_L$, respectively.

As described above, the parent-child relationship can be specified if the amplification factor and the shift quantity are set to the amplifier 3421 of the decoder on the side of the controller, the amplification factor and the shift quantity being adapted to a combination of $f_H$ and $f_L$ of the frequency modulator of the encoder that converts keycode from the keyboard into serial data.

In this case, the data code needs not be attached to the serial data. In the foregoing description, when both $V_H$ and $V_L$ have satisfied given values (e.g., $V_H$ is greater than 4.2V and $V_L$ is smaller than 2.2V), the logic "1" or the logic "0" is determined. When given ranges are satisfied ($V_{LL}$ to $V_{LH}$ for $V_L$ e.g , $V_{LL}=2.0V$, $V_{LH}=2.4V$, and $V_{HL}$ to $V_{HH}$ for $V_H$ e.g., $V_{HL}=4.0$ V, $V_{HH}=4.4V$), furthermore, the logic "1" or the logic "0" may be determined.

Described below is the case when the power source is supplied to the keyboard 3.

In the power supply sending side, a high-frequency coil 41 embedded in a desk 4 of FIG. 1 is driven by a high-frequency power supply 42. On the side of the keyboard 3, the electric power is received by a receiving coil 30 wound on the ferrite, and the voltage required by the circuit is generated by a power supply circuit 39.

In the foregoing description, the signals are transmitted between the controller 2 and the keyboard 3 in the form of light. Not being limited to light, however, the signals may be transmitted in the form of ultrasonic waves or electromagnetic waves.

In the description of the power supply, furthermore, the electric power is supplied to the keyboard 3 based on the combination of the high-frequency coil 41 and the receiving coil 30 in the keyboard 3. It is of course allowable to use generally known solar cells.

According to the present invention as described in the foregoing, the signals can be reliably transmitted using a cordless keyboard without any interface cable even in an environment where a plurality of OA equipment and terminal equipment are operated. Therefore, reliability is maintained just like when the signals are transmitted over the cables, eliminating the need for renewing the cells or recharging the cells.

While a preferred embodiment has been set foth along with modifications and variations to show specific advantageous details of the present invention, further embodiments, modifications and variations are contemplated within the broader aspects o the present inventions, all as set forth by the spirit and scope of the following claims.

What is claimed is:

1. A cordless keyboard in which signals are transmitted in a cordless manner between a keyboard and a controller related to said keyboard, wherein said controller comprises:
   receiving means which receives from said keyboard a signal that represents a keycode;
   sending means which sends back to said keyboard the signal that is received and that represents said keycode; and said controller includes means responsive to a next keycode received within a fixed period of time after said keycode has been received for discarding the keycode and sending back said next keycode.

2. A cordless keyboard according to claim 1, wherien said receiving means of said controller receives said keycode and a device code that is attached to said keycode and a device code that is attached to said keycode and that is specific to said keyboard, and wherien said controller is further provided with means which identifies the device code.

3. A cordless keyboard according to claim 1, wherien said sending means of said controller, sends back said keycode by attaching thereto a device code that is different from said device code that was received attached to said keycode.

4. A data processing apparatus having cordless communication between a keyboard and a controller, comprising:
   a controller module having a display, a controller, and transmission means interconnecting said display and controller for transmitting data;
   a keyboard module including a keyboard, and generator means for generating first and next keycodes in response to keys being activated;
   cordless communication means including transducer means in said controller module and transducer mean in said keyboard module for two-way sending and receiving of encoded radiation between said modules;
   said keyboard module including means storing the first keycode;
   said transducer means of said keyboard module transmitting fist radiation to said controller module that is encoded with said first keycode and with a keyboard device code that is unique to said keyboard module;
   said transducer mean for said controller module including a decoder for obtaining the received keyboard device code and received first keycode from eh first radiation received, comparator means for comparing the received keyboard device code with a fixed code for producing a comparison signal, encoder means responsive to the comparison signal for encoding the received first keycode acknowledgement with a controller device code that is unique to said controller module only when the comparison signal shows a correspondence;

said transducer means of said controller module transmitting second radiation encoded with said first keycode acknowledgment and said controller device code;

said keyboard module transducer means receiving the second radiation from said controller module that is encoded with the fist keycode acknowledgment and the controller device code;

said keyboard module including decoder means for obtaining the first keycode acknowledgment and controller device code from the received second radiation;

said keyboard module having comparator means for comparing the fist keycode in said storage means and the first keycode acknowledgement separated by said keyboard module decoder means and producing a corresponding correspondence or noncorrespondence signal; and said storage means, said encoder means and said transmitting means of said keyboard module transmitting second radiation encoded with the fist keycode in said storage means and keyboard device code only in response to a noncomparison signal, and transmitting second radiation encoded with a next keycode and device code in response to a correspondence signal.

5. The apparatus according to claim 4, including said controller module having means for establishing a fixed time period; and said controller module transducer means, decoder means and comparator means being responsive to receiving second radiation within said fixed time period from said first reception for erasing the stored keycode and storing the first keycode of the retransmitting radiation, and being response to receiving second radiation encoded with the next keycode after the expiration of said fixed time period, for storing said next keycode in addition to said fist keycode.

6. The apparatus according to claim 5, including power means, exterior of said controller module, for providing power to said keyboard module.

7. The apparatus according to claim 6, wherein said power means includes means in said keyboard module for receiving power radiation and converting it into an electrical power supply for said keyboard module.

8. The apparatus according to claim 7, wherein said power means includes a receiving coil and a power supply circuit electrically connected to said receiving coil; and said power means further including a power radiation supply module separate from said controller and keyboard modules, and including an electrical power supply and a high frequency transmitting coil electrically connected to said electrical power supply for providing electromagnetic ⁻¹⁻⁺⁻⁰⁻ to said receiving coil.

9. The apparatus according to claim 4, wherien said transducer means transit light radiation.

10. The apparatus according to claim 4, wherein said first keycode acknowledgement is said first keycode.

11. The apparatus according to claim 10, including said controller module having means or establishing a fixed time period; and said controller module transducer means, decoder means and comparator means being responsive to receiving second radiation within said fixed time period from said fist reception for erasing the stored keycode and storing the first keycode of the retransmitting radiation, and being response to receiving second radiation encoded with the next keycode after the expiration of said fixed time period, for storing said next keycode in addition o said fist keycode.

12. The apparatus according to claim 4, including said keyboard module comparator means producing a correspondence signal only if the controller medevac code matches a fixed expected device code.

13. The apparatus according to claim 12, including said controller module having means for establishing a fixed time period; and said controller module transducer means, decoder means and comparator mean being responsive to receiving second radiation within said fixed time period from said first reception for erasing the stored keycode and storing the first keycode of the retransmitting radiation, and being response to receiving second radiation encoded with the next keycode after the expiration of said fixed time period, for storing said next keycode in addition to said first keycode.

14. The apparatus according to claim 13 wherien said first keycode acknowledgment is said first keycode.

15. The apparatus according to claim 12, wherein said first keycode acknowledgment is said first keycode.

16. A method of transmitting data between a keyboard module and a separate controller module, comprising the steps of:

transmitting radiation from eh keyboard module to the controller module so that said radiation is encoded with a keycode specific to a key on the keyboard and with a device code uniquely specific to the keyboard module;

receiving said encoded radiation at the controller module and decoding it to obtain the keycode and device code;

sending radiation from h controller module to the keyboard module that is encoded with a keycode acknowledgement and a controller device code uniquely specific to the controller module only if the keyboard device code received matches a stored expected device code;

storing the received keycode as valid within said controller module only if the received keyboard device code matches the stored expected device code;

within said keyboard module decoding the radiation received from said controller module to obtain the controlled device code and keycode acknowledgement encoded herein; and within the keyboard module, comparing the decoded controller device code with a stored expected device code and retransmitting the radiation encoded with the keyboard device code and keycode only of the decoded keycode is not equal to he keycode stored in the keyboard module; and erasing the keycode stored in the controller module only if retransmitted radiation is received form the keyboard module within a fixed period of time after reception of the first radiation within said controller module.

* * * * *